(12) United States Patent
Yamashita et al.

(10) Patent No.: US 12,468,882 B2
(45) Date of Patent: Nov. 11, 2025

(54) DOCUMENT COMPARISON SYSTEM

(71) Applicant: TOYOTA JIDOSHA KABUSHIKI KAISHA, Toyota (JP)

(72) Inventors: Hiroyasu Yamashita, Toyota (JP); Yosuke Ueno, Nagoya (JP); Harufumi Muto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 18/539,168

(22) Filed: Dec. 13, 2023

(65) Prior Publication Data
US 2024/0232522 A1 Jul. 11, 2024

(30) Foreign Application Priority Data
Jan. 10, 2023 (JP) ................... 2023-001692

(51) Int. Cl.
*G06F 3/048* (2013.01)
*G06F 40/194* (2020.01)

(52) U.S. Cl.
CPC .................. *G06F 40/194* (2020.01)

(58) Field of Classification Search
CPC .................................... G06F 40/194
See application file for complete search history.

(56) References Cited

U.S. PATENT DOCUMENTS

| | | | | |
|---|---|---|---|---|
| 6,560,620 B1* | 5/2003 | Ching | .......... | G06V 30/416 |
| | | | | 707/999.203 |
| 7,260,773 B2* | 8/2007 | Zernik | .......... | G06F 40/194 |
| | | | | 707/999.203 |
| 11,966,444 B2* | 4/2024 | Thompson | .......... | G06F 16/33 |
| 2008/0034282 A1* | 2/2008 | Zernik | .......... | G06F 40/194 |
| | | | | 715/229 |
| 2021/0110153 A1* | 4/2021 | Gupta | .......... | G06F 16/906 |
| 2021/0303772 A1* | 9/2021 | Zhang | .......... | G06V 30/414 |
| 2024/0193127 A1* | 6/2024 | Singh | .......... | G06F 16/164 |

FOREIGN PATENT DOCUMENTS

| | | |
|---|---|---|
| JP | 2004126986 A | 4/2004 |
| JP | 2023114230 A | 8/2023 |

OTHER PUBLICATIONS

Ochoa et al., SealClub: Computer-aided Paper Document Authentication, 2022, ARXIV, 14 pages. (Year: 2022).*
Williams et al., Visual Discriminability of Headings in Text , 1992, IEEE, 7 pages. (Year: 1992).*
Marilyn Martin, The Semiology of Documents, 2025, IEEE, 7 pages. (Year: 1989).*
Betina et al., Document Creation with Information Retrieval System Support, 2013, IEEE, 5 pages. (Year: 2013).*

* cited by examiner

*Primary Examiner* — Linh K Pham

(57) ABSTRACT

A document comparison system is provided. Processing circuitry determines that a specific heading of a first document corresponds to corresponding headings of a second document. The processing circuitry generates a combined body by combining corresponding bodies of the second document with each other. The processing circuitry compares a specific body of the first document with the combined body of the second document to extract a difference between the specific body and the combined body.

5 Claims, 3 Drawing Sheets

| First Document X | | Difference | Second Document X | |
|---|---|---|---|---|
| Heading | Body | | Heading | Body |
| 1. | --- (a) ---. | Absent | 1. | --- (a) ---. |
| 1.1. | --- (b) ---. | Absent | 1.1. | --- (b) ---. |
| 1.2. | --- (c) ---. --- (d) ---. --- (e) ---. | Present | 1.2. | --- (c) ---. |
| | | | 1.2.1. | --- (d) ---. |
| | | | 1.2.2. | --- (e) ---. --- (f) ---. |
| 1.3. | --- (g) ---. | Absent | 1.3. | --- (g) ---. |
| 2. | --- (h) ---. | Absent | 2. | --- (h) ---. |

Fig.5

| First Document X | | Difference | Second Document X | |
|---|---|---|---|---|
| Heading | Body | | Heading | Body |
| 1. | ... (a) .... | Absent | 1. | ... (a) .... |
| 1.1. | ... (b) .... | Absent | 1.1. | ... (b) .... |
| 1.2. | ... (c) .... ... (d) .... ... (e) .... | Present | 1.2. | ... (c) .... |
| | | | 1.2.1. | ... (d) .... |
| | | | 1.2.2. | ... (e) .... ... (f) .... |
| 1.3. | ... (g) .... | Absent | 1.3. | ... (g) .... |
| 2. | ... (h) .... | Absent | 2. | ... (h) .... |

DOCUMENT COMPARISON SYSTEM

BACKGROUND

1. Field

The present disclosure relates to a document comparison system.

2. Description of Related Art

Japanese Laid-Open Patent Publication No. 2004-126986 discloses a document comparison system that compares documents with each other and displays their differences.

There is room for improvement in the document comparison system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a document comparison system. The document comparison system includes processing circuitry configured to provide a first document and a second document. Each of the first document and the second document includes headings and bodies. Each of the headings corresponding to one of the bodies.

The processing circuitry is configured to obtain a correspondence between each of the headings of the first document and a corresponding one of the headings of the second document, and to determine that a specific heading of the first document corresponds to corresponding headings of the second document. The specific heading is one of the headings of the first document. The corresponding headings are included in the headings of the second document. The processing circuitry is configured to generate a combined body by combining the corresponding bodies of the second document with each other. The corresponding bodies are bodies corresponding to the corresponding headings among the bodies of the second document. The processing circuitry is configured to compare a specific body of the first document with the combined body of the second document to extract a difference between the specific body and the combined body. The specific body is a body corresponding to the specific heading among the bodies of the first document.

Thus, the document comparison system extracts a substantially changed portion of the documents, which is not a formal change caused by merging and/or dividing the headings, as a difference.

There is a document, such as a legal document, having a hierarchical structure with headings, such as a chapter, a section, and a clause. In such a document having a hierarchical structure, headings may be integrated into one heading or one heading may be divided into headings in accordance with the revision or the like of a law. In the document comparison system of the related art, all portions corresponding to headings that have been increased or decreased by merging and/or division may be potentially detected as differences between documents. Thus, there may be a case where it is difficult to recognize a substantial difference between documents. The above configuration reduces such a risk.

Other features and aspects will be apparent from the following detailed description, the drawings, and the claims.

BRIEF DESCRIPTION OF DRAWINGS

FIG. 5 is a diagram showing an example of a comparison screen generated by the document comparison process of FIG. 2 as a result of FIG. 4.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a document comparison system will be described in detail with reference to FIGS. 1 to 5.

Document Comparison System Configuration

Figure 1:
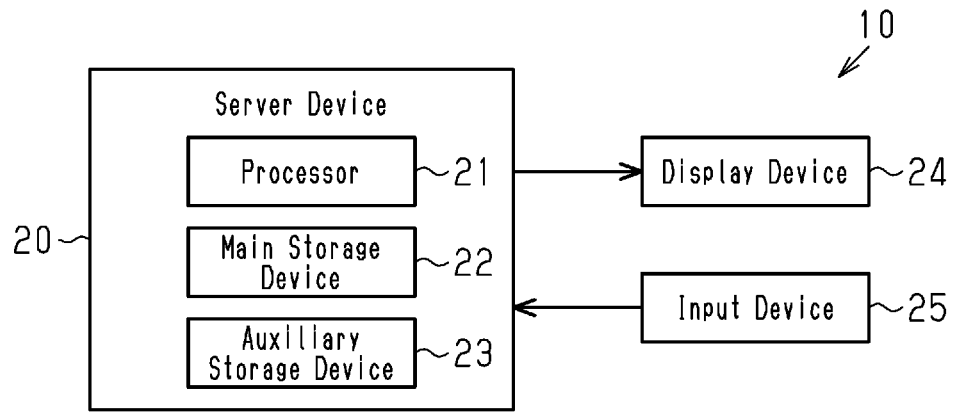
FIG. 1 is a diagram schematically showing the configuration of an embodiment of a document comparison system according to the present embodiment.

First, a configuration of a document comparison system 10 of the present embodiment will be described with reference to FIG. 1. The document comparison system 10 of the present embodiment includes a server device 20 including a processing circuit. The server device 20 can be configured by a general-purpose computer. In this case, the server device 20 includes a processor 21 such as a CPU or a GPU, a main storage device 22 such as a RAM or a ROM, and an auxiliary storage device 23 such as an EPROM or a hard disk drive. The auxiliary storage device 23 stores a control program. The processor 21 is processing circuitry that loads a control program stored in the auxiliary storage device 23 into the main storage device 22 and executes the control program. The processor 21 causes the document comparison system 10 to execute a document comparison process described later. A display device 24 and an input device 25 are connected to the server device 20 as user interfaces. The display device 24 is a device for displaying information, such as a display. The input device 25 is a device for a user to perform an operation, such as a keyboard and a mouse.

Structure of Document to be Compared

The structure of a document to be compared by the document comparison system 10 will now be described. Documents to be compared have a hierarchical structure to which headings such as chapters, sections, and clauses are assigned. Such a hierarchical document is, for example, a legal document. Such documents are provided with headings for each level. In the present embodiment, the heading of the first level, which is the highest level, is a chapter. The heading of the second level, which is one level below the first level, is a section. The heading of the third level, which is one level below the second level, is a clause. Each heading is assigned a heading number corresponding to the level. The heading number includes a number indicating the order of the heading. In the following description, the index of each level in the comparison document is expressed in the following format. The heading of the first level is expressed in the form of "(chapter number)." The heading of the second level is expressed in the form of "(chapter number) (section number)." The heading of the third level is expressed in the form of "(chapter number) (section number) (clause number)."

Document Comparison Process

Figure 2:
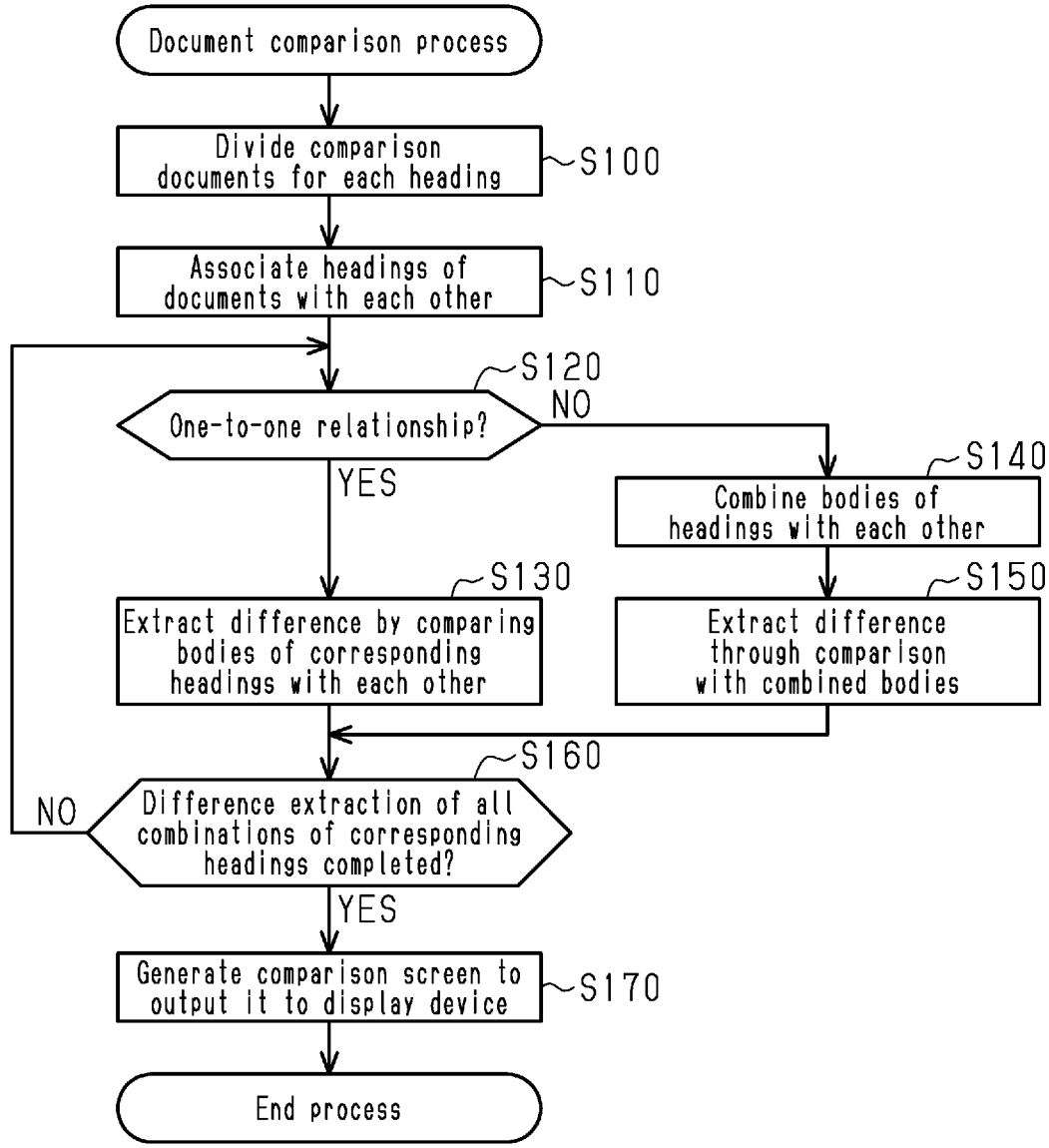
FIG. 2 is a flowchart of the document comparison process executed in the document comparison system of FIG. 1.

Next, a document comparison process executed in the document comparison system 10 will be described with reference to FIG. 2. The document comparison process shown in FIG. 2 is started in a state where the user selects data of two documents to be compared using the input device 25 and the server device 20 reads the data of the selected two documents. One of the two documents is referred to as a first document, and the other one of the two documents is referred to as a second document. The server device 20 step S170 in FIG. 2, the server device 20 ends the present process.

When the document comparison process is started, the server device 20 first divides the first document and the second document to be compared into blocks for each heading (S100). Next, the server device 20 performs association of headings by comparing the bodies of each block (S110). The body is a portion of each of the divided blocks excluding the heading. The association of headings refers to extracting a combination of headings between the first document and the second document in which the bodies are identical or similar. The server device 20 obtains the correspondence relationship between the headings of the first document and the second document to be compared with each other by associating the headings.

The association of headings is performed using a technique described in, for example, Japanese Patent Application No. 2022-016486. In the technique described in this document, a similarity between each block of a first document to be compared and each block of a second document is calculated. Under various constraints, the block having the maximum similarity is selected as the corresponding block. In such a case, one or more of the headings of the second document may be associated with each of the headings of the first document.

Next, the server device 20 extracts a difference for each of the combinations of the associated headings. When extracting a difference, server device 20 first determines whether or not the combination of headings being processed is a one to-one combination of headings (S120). That is, it is determined whether or not only one of the plurality of headings of the second document is associated with each of the plurality of headings of the first document. In the case of the one to-one combination (S120: YES), the server device 20 compares the bodies of the first document and the second document to which the corresponding headings are attached, and extracts a difference between the bodies (S130). On the other hand, there may be a case where the combination of headings being processed is a one to-plural combination (S120: NO). Here, the specific heading is one of a plurality of headings in the first document among the documents to be compared. There is a case where a plurality of corresponding headings among a plurality of headings of the second document are associated with the specific heading. In such a case, the server device 20 generates a combined body by combining a plurality of corresponding bodies corresponding to the plurality of corresponding headings among the plurality of bodies of the second document (S140). The server device 20 compares the combined body with the specific body corresponding to the specific heading among the bodies of the first document to extract the difference between the combined body and the specific body (S150).

When server device 20 completes the extraction of the differences for all the combinations of the associated headings (S160: YES), the process proceeds to step S170. In step S170, the server device 20 generates a comparison screen indicating the comparison result of the documents and outputs the comparison screen to the display device 24. The comparison screen is a screen on which the first document and the second document to be compared are displayed side by side in a manner in which the extracted difference portion is distinguished from the other portions by character color, font, or the like. As described above, there is a case where a plurality of corresponding headings of the second document correspond to a specific heading of the first document. In such a case, the server device 20 generates the comparison screen so as to display the headings and the corresponding bodies of the second document side by side with the specific heading and the specific body of the first document.

Operation and Advantages of Present Embodiment

Figure 3:
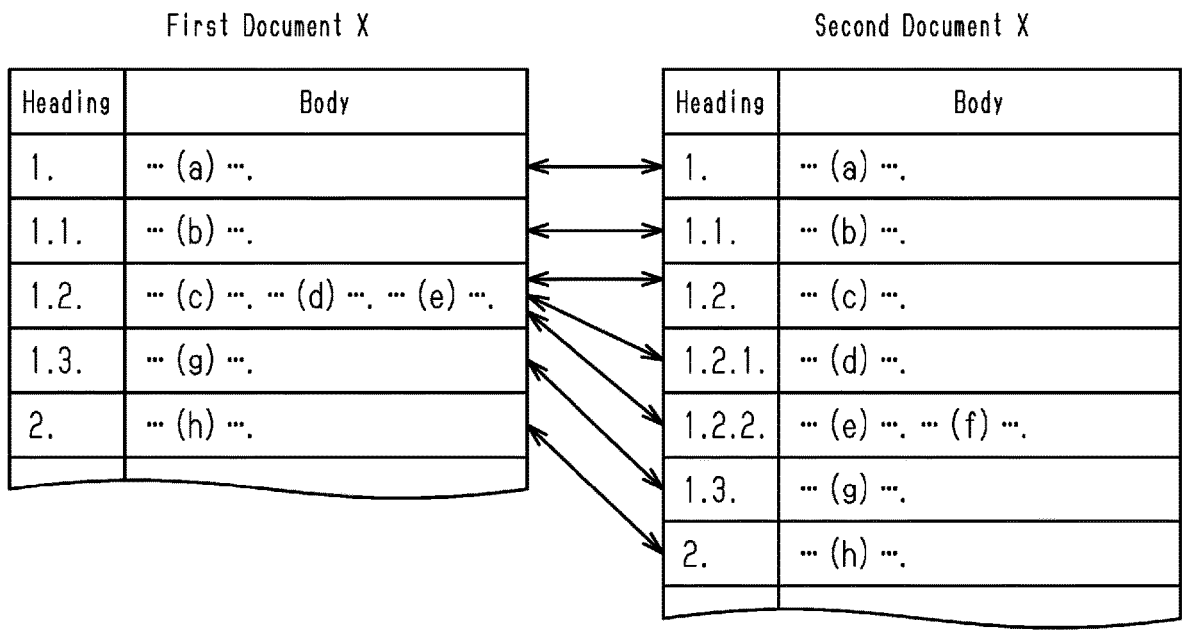
FIG. 3 is a diagram showing an example of how headings are associated with each other in the document comparison process of FIG. 1.

The operation of the present embodiment will be described with reference to an example in which a first document X and a second document Y each having a structure as shown in FIG. 3 are compared with each other. Each of the texts (a) to (h) shown in FIG. 3 and the drawings described later is composed of one or more sentences.

The difference between the first document X and the second document Y provided in this embodiment is as follows. In the second document Y, the content of the section "1.2." of the first document X is divided into three headings "1.2.", "1.2.1.", and "1.2.2." and described. More specifically, the body of the section "1.2." of the first document X is composed of three texts (c), (d), and (e). The body of the section "1.2." of the first document X is divided into the section "1.2." including the text (c) as the body, the clause "1.2.1." including the text (d) as the body, and the clause "1.2.2." including the text (e) as the body. The section and the clauses are then described in the second document Y. In addition to the text (e), a text (f) is newly added to the body of the clause "1.2.2." of the second document Y.

As described above, in the document comparison process, the server device 20 obtains the correspondence relationship between the headings of the documents to be compared. In this embodiment, the headings are associated with each other based on the degree of similarity of the body. In the case of the first document X and the second document Y in FIG. 3, headings whose bodies coincide with each other are associated with each other. The body of the section "1.2." of the first document X, which is common to at least a part of the body of each of the section "1.2.", the clause "1.2.1.", and the clause "1.2.2." of the second document Y, has the highest degree of similarity to the bodies of the section "1.2.", the clause "1.2.1.", and the clause "1.2.2." of the second document Y among the bodies of the first document X. Therefore, the section "1.2.", the clause "1.2.1.", and the clause "1.2.2." of the second document Y are associated with the section "1.2." of the first document X. That is, the heading "1.2." of the first document X is a specific heading corresponding to the headings "1, 2.", "1,2.1.", and "1,2.2." of the second document Y. The headings "1, 2.", "1,2.1.", and "1,2.2." of the second document Y are a plurality of corresponding headings corresponding to the specific heading "1.2." of the first document X. The body of the section "1.2." of the first document X, that is, the texts (c), (d), and (e) of the first document X are the specific body corresponding to the specific heading "1.2.". The body of the section "1.2.", the body of the clause "1.2.1", and the body of the clause "1.2.2." of the second document Y, that is, the texts (c), (d), (e), and (f) of the second document Y are corresponding bodies corresponding to the corresponding headings "1, 2.", "1,2.1.", and "1,2.2.".

Subsequently, the server device 20 compares the bodies corresponding to the associated headings with each other to extract a difference therebetween. When the headings correspond to each other in a one-to-many relationship, the server device 20 combines the corresponding bodies corresponding to the corresponding headings that correspond to the common specific heading. Then, the server device 20 extracts a difference between the combined body and the specific body by comparing the combined body with the specific body corresponding to the specific heading.

Figure 4:
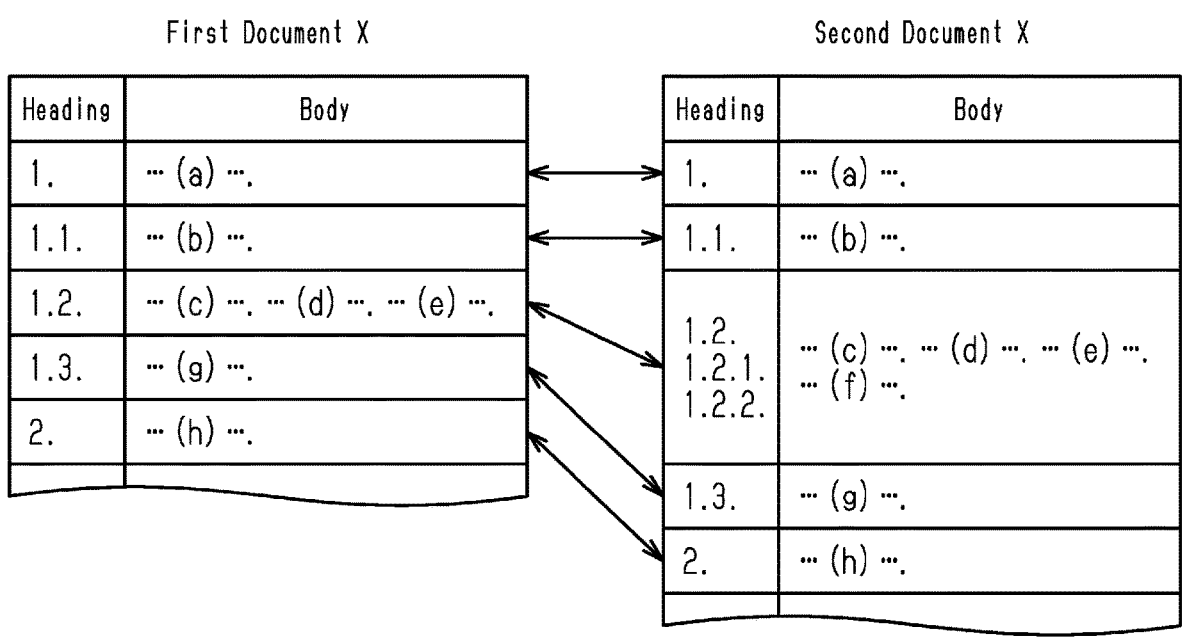
FIG. 4 is a diagram showing an example of how difference extraction in the document comparison process of FIG. 2 is executed, following FIG. 3.

FIG. 4 shows how the difference between the first document X and the second document Y is extracted. In the case of FIG. 4, the server device 20 combines the body of the section "1.2.", the body of the clause "1.2.1.", and the body of the clause "1.2.2." of the second document Y corresponding to the section "1.2." of the first document X. That is, the server device 20 combines the text (c), which is included in the body of the section "1.2." of the second document Y, the text (d), which is included in the body of the clause "1.2.1.", and the texts (e) and (f), which are included in the body of the clause "1.2.2.", with each other. The server device 20 compares the combined body in which the texts (c) to (f) have been combined with the body of the section "1.2." of the first document X with each other to extract a difference therebetween. The body of the section "1.2." of the first document X is composed of texts (c) to (e). Therefore, in this case, the text (f) constituting a part of the body of the clause "1.2.2." of the second document Y is extracted as the difference.

Thereafter, the server device 20 generates a comparison screen based on the extraction result of the difference, and outputs the generated comparison screen to the display device 24. Thus, the display device 24 displays a comparison screen in which the first document and the second document to be compared are displayed side by side in a manner in which the extracted difference portion is distinguished from the other portions.

FIG. 5 shows a display example of the comparison screen in the case of the first document X and the second document Y. In the case of FIG. 5, the extracted difference portion, that is, the text (f) is displayed with an underline. In other words, in the example of FIG. 5, the extracted difference portion is underlined in a manner in which the extracted difference portion is distinguished from the other portions.

On the comparison screen in this case, the index numbers and the body of the corresponding indices of the first document X and the second document Y are displayed side by side. In the case of FIG. 5, the presence or absence of a difference is displayed in a portion between the body of the first document X and the heading number of the second document Y on the display screen. On the right side of the display portion of the heading number of the section "1.2." of the first document X and the body thereof in the comparison screen of FIG. 5, the heading numbers of the section "1.2.", the clause "1.2.1." and the clause "1.2.2." of the second document Y and the body thereof are displayed. Further, on the comparison screen of FIG. 5, the text (f) constituting a part of the body of the clause "1.2.2." of the second document Y is displayed with an underline as a difference portion from the first document X.

According to the document comparison system 10 of the present embodiment described above, the following effects can be obtained.

(1) One and the other of two documents to be compared by the document comparison system 10 in the document comparison process are referred to as a first document X and a second document Y. The server device 20 of the document comparison system 10 performs the following processing when a specific heading, which is one of a plurality of headings of the first document X, corresponds to a plurality of headings of the second document Y. The combined body is obtained by combining the corresponding bodies of the plurality of corresponding headings of the second document Y. The specific body of the first document X corresponds to the above-mentioned specific heading. The server device 20 compares the combined body of the second document Y and the specific body of the first document X with each other to extract a difference therebetween. This allows a substantially changed portion of the second document Y for the first document X, which is not a formal change caused by merging and/or division of headings, to be extracted as a difference.

(2) The server device 20 generates a comparison screen and outputs the generated comparison screen to the display device 24. The comparison screen displays the first document X and the second document Y side by side in a manner in which the text (f) as the extracted difference portion is distinguished from the other portions. Further, when a specific heading of the first document X has a correspondence relationship with a plurality of corresponding headings of the second document Y, the server device 20 performs the following processing. The server device 20 generates the comparison screen so as to display the specific heading and the specific body of the first document X and the plurality of corresponding headings and their corresponding bodies of the second document Y side by side. Accordingly, the substantially changed portion of the text can be presented to the user in an easy-to-understand manner.

Modifications

The present embodiment may be modified as follows. The present embodiment and the following modifications can be combined as long as the combined modifications remain technically consistent with each other.

In the comparison screen, the difference portion and the other portions may be displayed so as to be distinguished from each other by a method other than underlining, such as changing a character color or a font.

In the comparison screen, the headings and the bodies in the correspondence relationship between the first document X and the second document Y may be displayed not horizontally but vertically.

Since the document to be compared may be a document having a hierarchical structure to which a plurality of headings are attached, the document may be a document other than a legal document. Such documents include, for example, product instructions and specifications, regulation documents, and treatises.

Since the document comparison system may be a system including processing circuitry that executes document comparison process, the configuration of the document comparison system may be changed as appropriate. For example, the document comparison system may be configured by a server device and a client terminal connected to the server device through a communication line. In this case, a part of the document comparison process may be performed by the server device, and the remaining part may be performed by the client terminal. For example, the server device performs the processing (S100 to S160) up to the difference extraction in the document comparison process of FIG. 2. The server device transmits information on the extraction result of the difference to the client terminal. The client terminal may generate the comparison screen based on the information received from the server device and output the generated comparison screen to a display device included in the client terminal.

The number of levels and the notation format of the heading may be changed.

The display device 24 is not limited to a display. For example, a printer that displays the comparison screen by printing it on paper or the like may be used as the display device 24.

The extraction result of the difference by the document comparison process may be used for a purpose other than generation of the comparison screen.

The processing circuitry is not limited to a device that includes a CPU and a ROM and executes software processing. That is, the processing circuitry may be modified as long as it has any one of the following configurations (a) to (c). (a) The processing circuitry includes one or more processors that execute various processes in accordance with a computer program. The processor includes a CPU and a memory, such as a RAM and ROM. The memory stores program codes or instructions configured to cause the CPU to execute the processes. Memory, or computer-readable storage media, includes any available media (including non-transitory computer-readable storage media) that can be accessed by a general purpose or special purpose computer. (b) The processing circuitry includes one or more dedicated hardware circuits that execute various processes. Examples of the dedicated hardware circuits include an application specific integrated circuit (ASIC) and a field programmable gate array (FPGA). (c) The processing circuitry includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A document comparison system, comprising:
a memory that stores a first document and a second document, each including a plurality of blocks, each block comprising a heading and a body; and
processing circuitry configured to:
determine a correspondence relationship between the headings of the first document and the headings of the second document based on whether the respective bodies are similar to each other, including a case where a single heading of the first document corresponds to multiple headings of the second document due to differences in levels of heading structure between the documents;
generate, for each heading of the first document that corresponds to multiple headings of the second document, a combined body by concatenating the respective bodies of the corresponding headings in the second document;
compare the combined body with the body of the corresponding heading in the first document to extract a difference;
generate and output a comparison screen in a manner in which the extracted difference is distinguished from other portions, wherein the comparison screen displays the first document and the second document side by side; and
generate the comparison screen so as to display a specific heading and a specific body side by side with the corresponding headings and the corresponding bodies; wherein the comparison screen displays the extracted difference at a paragraph level within the body text.

2. The document comparison system according to claim 1, wherein the first document and the second document are legal documents.

3. The document comparison system according to claim 1, wherein each heading includes hierarchical level information, and the correspondence relationship is determined by considering both textual similarity of the bodies and the hierarchical levels of the headings.

4. The document comparison system according to claim 1, wherein the bodies corresponding to the multiple headings in the second document are concatenated in the order in which the headings appear in the second document.

5. The document comparison system according to claim 1, wherein the difference is visually emphasized using at least one of underlining, strike-through, or color highlighting.

\* \* \* \* \*